US012650201B2

(12) United States Patent
Lee

(10) Patent No.: US 12,650,201 B2
(45) Date of Patent: *Jun. 9, 2026

(54) HANDLE GRIP

(71) Applicant: Yi-Hao Lee, Tainan City (TW)

(72) Inventor: Yi-Hao Lee, Tainan City (TW)

( * ) Notice: Subject to any disclaimer, the term of this patent is extended or adjusted under 35 U.S.C. 154(b) by 786 days.

This patent is subject to a terminal disclaimer.

(21) Appl. No.: 18/081,990

(22) Filed: Dec. 15, 2022

(65) Prior Publication Data

US 2023/0204155 A1     Jun. 29, 2023

(30) Foreign Application Priority Data

Dec. 27, 2021    (TW) ................................. 110148983

(51) Int. Cl.
| | |
|---|---|
| *F16M 13/06* | (2006.01) |
| *A46B 17/06* | (2006.01) |
| *F16M 11/22* | (2006.01) |
| *F16M 13/04* | (2006.01) |
| *F16N 13/04* | (2006.01) |

(52) U.S. Cl.
CPC ............ *F16M 13/06* (2013.01); *F16M 11/22* (2013.01); *F16N 13/04* (2013.01); *A46B 17/06* (2013.01)

(58) Field of Classification Search
CPC ........ F16M 13/06; F16M 13/04; F16M 11/22; A63H 33/42; A46B 17/06
See application file for complete search history.

(56) References Cited

U.S. PATENT DOCUMENTS

| | | |
|---|---|---|
| 5,129,157 A | 7/1992 | Wood |
| 10,578,246 B2 | 3/2020 | Peteranecz |

| | | | |
|---|---|---|---|
| 12,157,219 B2 * | 12/2024 | Doomany | .............. B25G 1/102 |
| 2008/0034554 A1 | 2/2008 | Ko | |
| 2019/0154197 A1 * | 5/2019 | Peteranecz | ............. F16M 13/04 |
| 2019/0299389 A1 | 10/2019 | Tsai | |
| 2020/0015950 A1 | 1/2020 | Crotaz | |
| 2024/0337351 A1 * | 10/2024 | Lee | ......................... F16M 13/06 |

FOREIGN PATENT DOCUMENTS

| | | |
|---|---|---|
| CN | 200963806 Y | 10/2007 |
| GB | 2526546 A | 12/2015 |
| JP | 2011-246185 A | 12/2011 |
| JP | 2019-142535 A | 8/2019 |
| TW | M550677 U | 10/2017 |
| TW | M613896 U | 7/2021 |
| WO | WO2017041787 A1 | 3/2017 |
| WO | WO2020205557 A1 | 10/2020 |

OTHER PUBLICATIONS

Extended European Search Report Application No. EP22210096, May 25, 2023.

* cited by examiner

*Primary Examiner* — Seahee Hong
(74) *Attorney, Agent, or Firm* — MUNCY, GEISSLER, OLDS & LOWE, P.C.

(57) ABSTRACT

A handle grip includes a base extension and a top seat. The base extension has a shell, an opening is arranged at a free end of the shell, and an accommodation space is provided in the shell and connected with the opening, the accommodating space can be filled in with liquid or solid materials, and the base extension can be detachably covered by the top seat. So that a user can freely adjust the weight of the handle grip according to the operation requirement of the work on miniature, neither the handle grip will fall down on the workbench easily, nor user will feel burdened when holding the handle grip, so that it will improve the working quality and efficiency.

10 Claims, 4 Drawing Sheets

HANDLE GRIP

CROSS-REFERENCE TO RELATED APPLICATION

This application claims the priority benefit of Taiwan application no. 110148983, filed 2021 Dec. 27. The entirety of each of the above-mentioned patent applications is hereby incorporated by reference herein and made a part of this specification.

TECHNICAL FIELD

The present invention relates to a handle apparatus, more particularly, to a handle grip for painting hobby miniatures.

BACKGROUND

Many miniature enthusiasts will use a painting handle to place the miniatures on it for assembling or painting and other operations, so a suitable painting handle is very important for modeling operations. However, many commercial products of painted grips are too light in weight. while carrying a model object with a heavy weight or a high center of gravity, the painted grip will easily fall on the workbench. If the user chooses a heavier or larger paint grip, the miniature would not easy to lose balance and fall down though, it will increase the burden of the user while holding it on the hand.

SUMMARY

Accordingly, the present invention provides a handle grip for users to freely adjust the weight of the handle grip according to the operation requirement of the work on miniature.

The present invention has been made in view of the above problems. The present disclosure provides a handle grip, comprising a base extension, and a top seat. The base extension comprises a shell, an opening which is arranged at a free end of the shell, and an accommodating space which is set inside the shell and connects with the opening, and the accommodating space can be filled in with liquid or solid. The top seat detachably covered on the base extension.

According to the handle grip of the invention, the user could freely adjust the weight of the handle grip according to the operation requirement, so that the handle grip won't fall down on the workbench easily, and will not increase the burden while user holding the handle grip on hand. The present disclosure will improve the miniature working quality and effectively.

DETAILED DESCRIPTION

Figure 1:
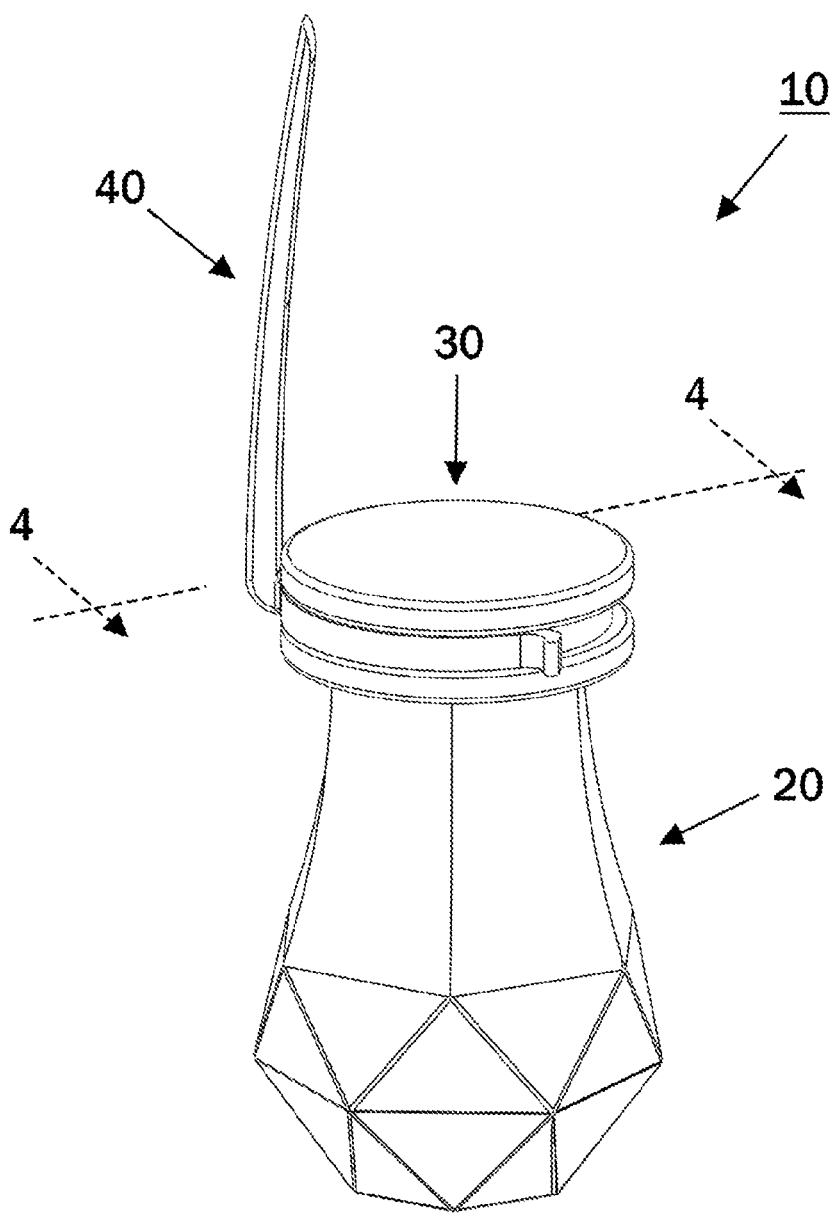
FIG. 1 is a schematic view of a handle grip according to a preferred embodiment of the present invention.

Reference will now be made in detail to the exemplary embodiments of the disclosure, examples of which are illustrated in the accompanying drawings. Wherever possible, the same reference numbers are used in the drawings and the description to refer to the same or like parts.

Some words are used to refer to specific elements in the whole specification and the appended claims in the disclosure. A person skilled in the art should understand that a handle grip may use different names to refer to the same elements. The specification is not intended to distinguish elements that have the same functions but different names. In the following specification and claims, the terms "having", "including", etc. are open-ended terms, so they should be interpreted to mean "including but not limited to . . . ".

It should be noted that in the following embodiments, features in a plurality of embodiments may be replaced, recombined, or mixed to complete other embodiments without departing from the spirit of the disclosure. The features of the embodiments may be used in any combination without departing from the spirit of the disclosure or conflicting with each other.

Figure 2:
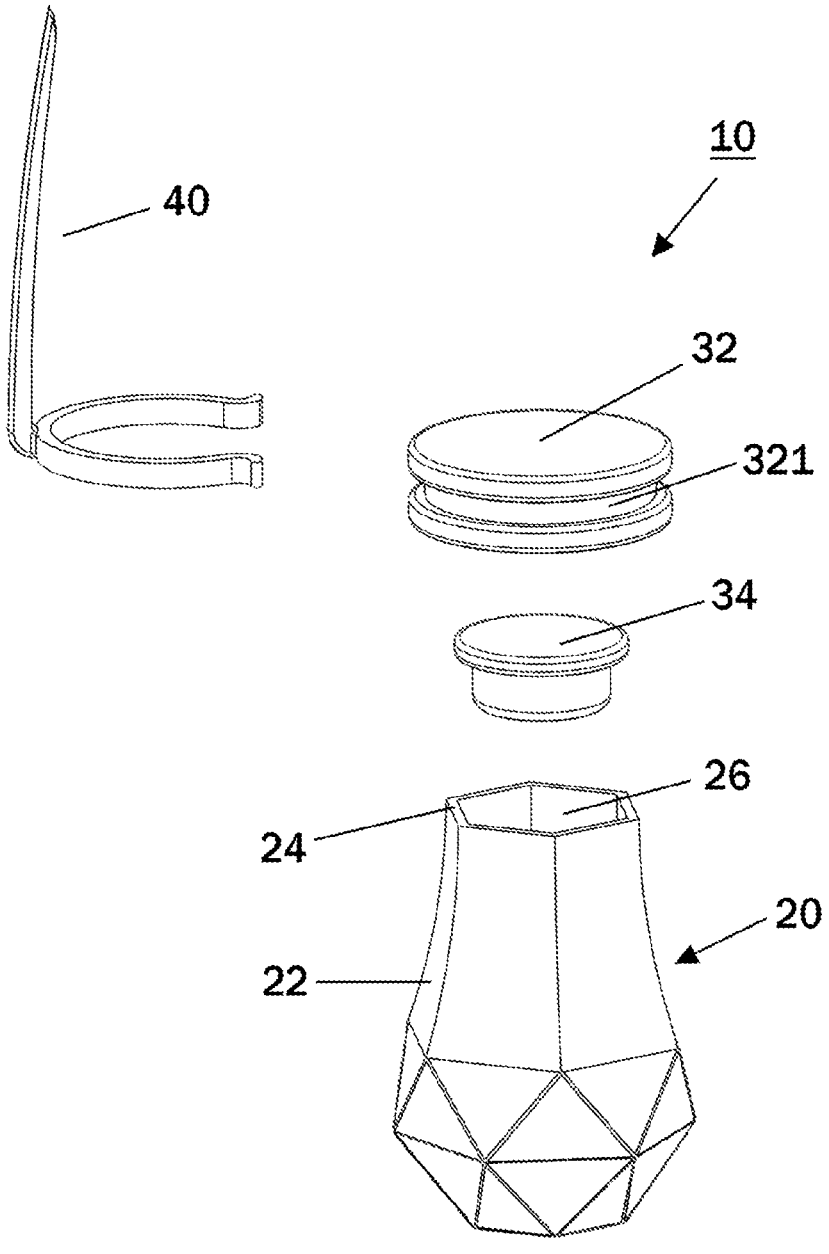
FIG. 2 and FIG. 3 is an exploded view of a handle grip according to a preferred embodiment of the invention.
Figure 3:
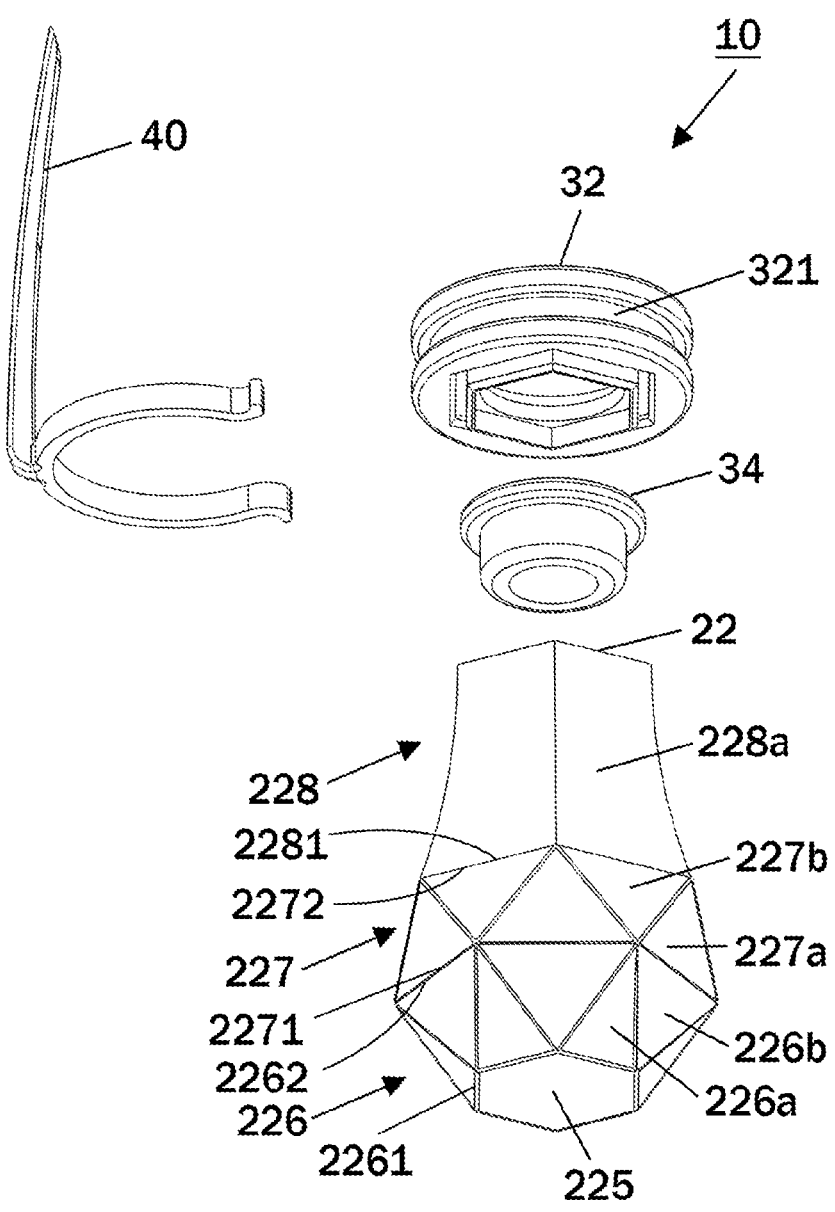

The technical content and feature of the invention is illustrated by the following preferred embodiment and figures. Referring to FIG. 1 to FIG. 3, a handle grip 10 of the invention comprises a base extension 20, a top seat 30 detachably covered on the base extension, and a finger rest 40 disposed on the top seat 30. The handle grip is used to carry a miniature (not shown) for the user to perform model-related operations such as miniature assembly or painting.

Figure 4:
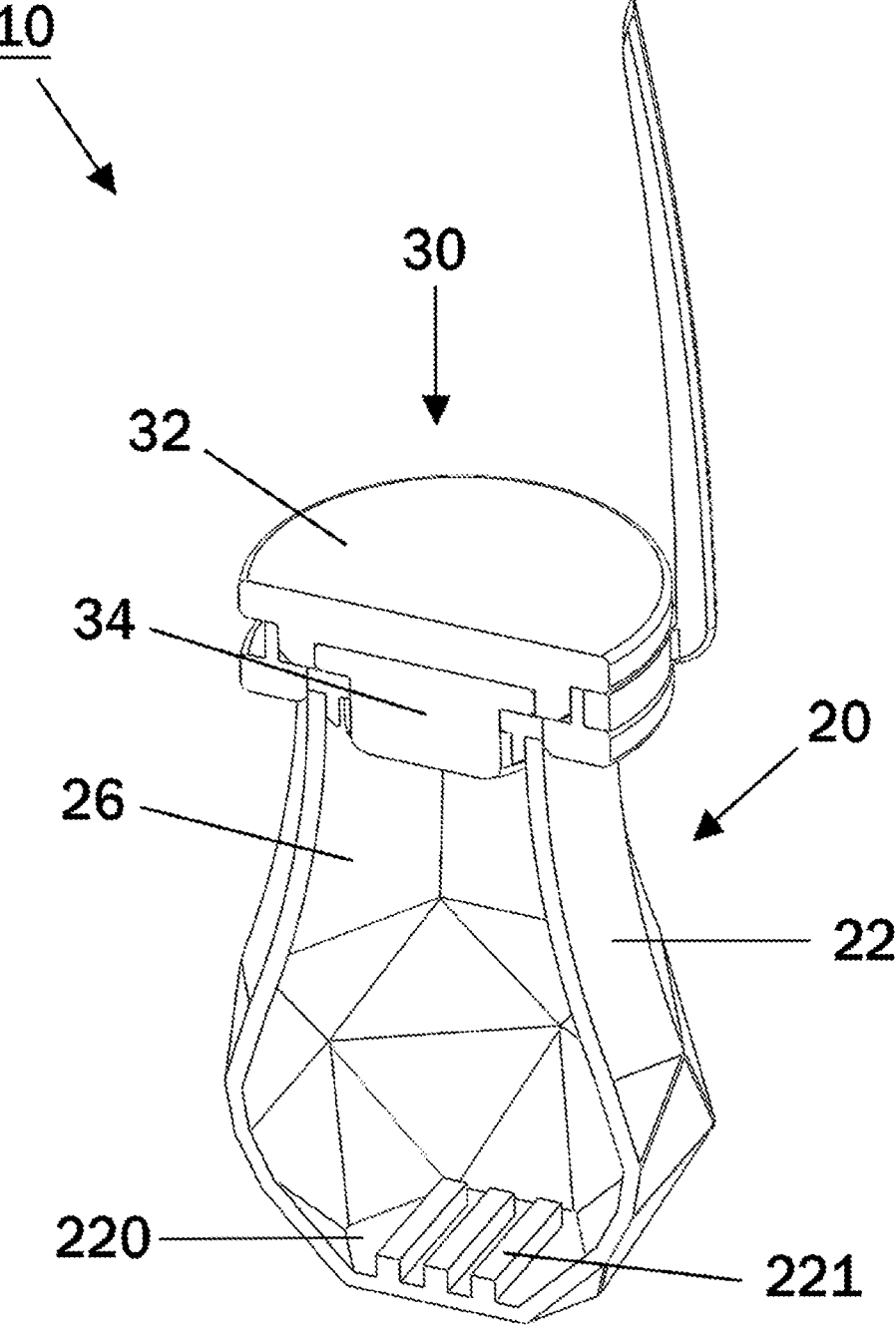
FIG. 4 is a cross-sectional operational view of 4-4 of FIG. 1.

Referring to FIG. 2, the base extension could put on a workbench (not shown). The base extension is including a shell 22, an opening 24 is arranged on a free end of the shell 22, and an accommodating space 26 is set inside the shell 22 and connecting with the opening 22. The accommodating space can be filled in with liquid or solid. Referring to FIG. 4, there are three protrusions 221 in the inner side of the shell 22, and the three protrusions 211 are disposed on the inner bottom surface 220 of the shell 22, wherein the inner bottom surface 220 is the bottom of the inner side of the shell 22. Furthermore, as shown in FIG. 3, the shell 22 having an outer bottom surface 225 in the form of a regular polygon that located on the outer side of the shell 22, a first bottom layer 226 extending upward from the outer bottom surface 225, a second bottom layer 227 extending upward from the first bottom layer 226, and a third bottom layer 228 extending upward from the second bottom layer 227. Meanwhile, the first bottom layer 226 has a first lower contour 2261 connected to the outer bottom surface 225, a first upper contour 2262 is a regular polygon; The second bottom layer 227 has a second lower contour 2271 connected to the first upper contour 2262 of the first bottom layer 226, the second upper contour 2272 is a regular polygon; The third bottom layer 228 has a third lower contour 2281 connected to the second upper contour 2272 of the second bottom layer 227.

Referring to FIG. 3, there are connecting lines between the vertex of the first lower contour 2261 and the vertex of the first upper contour 2262, and there are connecting lines between vertex of the second lower contour 2271 and at least one vertex of the second upper contour 2272. Referring to the connection lines formed by the vertices between the above-mentioned contours, the handle grip presents a composite structure with multiple levels and a plurality of planes with different angles. When the user holds the handle grip, the plurality of planes and the vertices can fit multiple different parts of the palm and fingers to achieve the effect of not slipping easily.

In this embodiment, the outer bottom surface 225 is a regular hexagon, the first bottom layer 226 has six first triangular surfaces 226*a* which is connected to the six sides of the outer bottom surface 225 respectively, and six first inverted triangular surfaces 226b respectively connect to the two of the first triangular surfaces 226a in between, the second bottom layer 227 has six second triangular surfaces 227a which is connected to the first inverted triangular surface 226b respectively, and six second inverted triangular surfaces 227b respectively connect to the two of the second triangular surfaces 227a in between, the third bottom layer 228 has six extending surfaces 228a respectively connect to the second inverted triangular surface 227b.

The top seat 30 comprises a stand 32, and a plug 34 to be detachably mounted on the stand 32. The stand 32 comes against the top edge of the shell 22, and the plug 34 is partially extended into the accommodating space 26, so that the accommodating space 26 could be closed. The stand 32 comprise a neck portion 321 to be attached round by the finger rest 40 which is used for the user's finger to lean against to facilitate model-related operations, and in other embodiments, the finger rest 40 may be removed or omitted depending on user's need. Since the plug 34 is detachably mounted on the stand 32, the plug 34 could be replaced as required. In this embodiment, the top seat 30 can be used for placing the miniature thereon, and the plug 34 is a rubber.

Referring to above mentioned structure, while using the handle grip 10 to perform model operations such as assembling or painting, when the weight of the model is heavier or the center of gravity is high, the user can open the top seat 30, then pour liquids such as water or solids such as sand into the accommodating space 26 to make the overall weight of the handle 10 heavier, lower the center of gravity of the handle grip, and then cover the top seat 30. In this way, the handle grip 10 carrying the model will not fall on the workbench easily. Similarly, when the weight of the model is light or the center of gravity is low, the user does not need to use the heavier handle grip 10, and could pour out the liquid or solid in the accommodating space 26, so that the overall weight of the handle grip 10 would be lighter, thus reducing the burden on the user's hand. User can freely adjust the weight of the handle grip 10 according to different model working patterns, thereby improving the work quality of the model operation effectively. Furthermore, the shell 22 has a special multilayer structure as described above, therefore when the user holds the handle grip 10, the shell 22 could be in contact with the palm of his/her hand, which is comfortable to hold and has the anti-slip effect at the same time. On the other hand, when the accommodating space 26 is filled in with a liquid such as water, the base extension 20 can be used as a container for cleaning paintbrush, that is, a used paintbrush could be put into the accommodating space 26 and to be washed by water, and could be rubbed against the protrusions 221 to scrape off the paint on the paintbrush, therefore improving the efficiency of washing the paintbrush.

According to the concept of the invention, the structure of the handle grip 10 can be modified. For example, the protrusions 221 can be arranged at other place inside the shell 22, and the number of protrusions 221 can be changed according the requirements, even the protrusions 221 could be omitted. The structure of the top seat 30 is not limited to the above-mentioned type, for example, the plug 34 can be integrally formed with the stand 32, or the structure of the top seat 30 can be designed in other derivative works, as long as the top seat 30 can open or close the opening 24 and the accommodating space 26 of the base extension 20. The outer bottom surface 225 of the shell 22 can be in other shapes such as a circle, an irregular shape, a polygon, or a regular polygon, and the number of the bottom layers of the shell 22 can be changed according to actual need, and even the structure of each bottom layer can also be changed according to the requirement.

Although the disclosure has been described in detail with reference to the foregoing embodiments, a person of ordinary skill in the art should understand that modifications may still be made to the technical solutions in the foregoing embodiments, or equivalent replacements may be made to part or all of the technical features; and these modifications or replacements will not cause the essence of corresponding technical solutions to depart from the scope of the technical solutions in the embodiments of the disclosure.

The invention claimed is:

1. A handle grip, comprising:
a base extension, comprising:
a shell;
an opening to be arranged at a free end of the shell;
an accommodating space; and
wherein the accommodating space is provided inside the shell and connected with the opening, and wherein the accommodating space can be filled with liquid or solid;
a top seat detachably covered on the base extension, comprising:
a stand for object to be placed steady;
a plug detachably mounted on the stand;
wherein the stand comes against a top edge of the shell, and the plug partially extends into the accommodating space for closing thereof;
a finger rest disposed on the top seat.

2. The handle grip of claim 1, wherein the shell comprises at least one protrusion in the inner side of the shell.

3. The handle grip of claim 2, wherein the at least one protrusion is disposed on an inner bottom surface of the shell.

4. The handle grip of claim 1, wherein the stand comprises a neck portion, and wherein the finger rest is attached round on the neck portion.

5. The handle grip of claim 1, wherein the shell comprises an outer bottom surface to be arranged on an outer side of the shell, a first bottom layer extends upward from the outer bottom surface, a second bottom layer extends upward from the first bottom layer, and a third bottom layer extends upward from the second bottom layer.

6. The handle grip of claim 5, wherein the first bottom layer comprises a first lower contour to be connected to the outer bottom surface, and a first upper contour is a regular polygon, and wherein the second bottom layer comprises a second lower contour to be connected to the first upper contour of the first bottom layer, and a second upper contour.

7. The handle grip of claim 6, wherein the second upper contour is a regular polygon.

8. The handle grip of claim 6, which further comprises connecting lines between a vertex of the first lower contour and at least a vertex of the first upper contour, and connecting lines between a vertex of the second lower contour and at least one vertex of the second upper contour.

9. The handle grip of claim 6, wherein the outer bottom surface is a regular hexagon.

10. The handle grip of claim 6, wherein the first bottom layer comprises six first triangular surfaces connected to six sides of the outer bottom surface respectively, and six first inverted triangular surfaces respectively connected to the two of the first triangular surfaces in between, and wherein the second bottom layer comprises six second triangular surfaces connected to the first inverted triangular surface respectively, and six second inverted triangular surfaces respectively connected to the two of the second triangular surfaces in between, and wherein the third bottom layer comprises six extending surfaces respectively connected to the second inverted triangular surface.

* * * * *